United States Patent
Zechner et al.

(10) Patent No.: US 9,361,908 B2
(45) Date of Patent: Jun. 7, 2016

(54) COMPUTER-IMPLEMENTED SYSTEMS AND METHODS FOR SCORING CONCATENATED SPEECH RESPONSES

(75) Inventors: Klaus Zechner, Princeton, NJ (US); Su-Youn Yoon, Lawrenceville, NJ (US); Lei Chen, Pennington, NJ (US); Shasha Xie, Lawrenceville, NJ (US); Xiaoming Xi, Pennington, NJ (US); Chaitanya Ramineni, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 410 days.

(21) Appl. No.: 13/556,439

(22) Filed: Jul. 24, 2012

(65) Prior Publication Data

US 2013/0030808 A1  Jan. 31, 2013

Related U.S. Application Data

(60) Provisional application No. 61/512,561, filed on Jul. 28, 2011, provisional application No. 61/566,159, filed on Dec. 2, 2011, provisional application No. 61/620,005, filed on Apr. 4, 2012.

(51) Int. Cl.
- *G09B 19/06* (2006.01)
- *G10L 25/60* (2013.01)
- *G09B 19/04* (2006.01)
- *G10L 15/26* (2006.01)

(52) U.S. Cl.
CPC ............... *G10L 25/60* (2013.01); *G09B 19/04* (2013.01); *G09B 19/06* (2013.01); *G10L 15/26* (2013.01)

(58) Field of Classification Search
CPC ..... G09B 19/06; G09B 5/04; G06F 17/30427
See application file for complete search history.

(56) References Cited

U.S. PATENT DOCUMENTS

| | | | | |
|---|---|---|---|---|
| 3,703,602 A | * | 11/1972 | Shenshev | 434/157 |
| 3,946,504 A | * | 3/1976 | Nakano | 434/185 |
| 4,507,750 A | * | 3/1985 | Frantz et al. | 704/277 |
| 4,615,680 A | * | 10/1986 | Tomatis | 434/157 |
| 4,884,972 A | * | 12/1989 | Gasper | 434/185 |
| 5,153,913 A | * | 10/1992 | Kandefer et al. | 704/260 |
| 5,503,560 A | * | 4/1996 | Stentiford | 434/167 |
| 6,112,177 A | * | 8/2000 | Cosatto et al. | 704/260 |
| 6,491,525 B1 | * | 12/2002 | Hersh | G09B 5/065 434/236 |

(Continued)

OTHER PUBLICATIONS

Bernstein, Jared, Van Moere, Alistair, Cheng, Jian; Validating Automated Speaking Tests; Language Testing, 27(3); pp. 355-377; 2010.

(Continued)

*Primary Examiner* — Michael N Opsasnick
(74) *Attorney, Agent, or Firm* — Jones Day

(57) ABSTRACT

Systems and methods are provided for scoring non-native speech. Two or more speech samples are received, where each of the samples are of speech spoken by a non-native speaker, and where each of the samples are spoken in response to distinct prompts. The two or more samples are concatenated to generate a concatenated response for the non-native speaker, where the concatenated response is based on the two or more speech samples that were elicited using the distinct prompts. A concatenated speech proficiency metric is computed based on the concatenated response, and the concatenated speech proficiency metric is provided to a scoring model, where the scoring model generates a speaking score based on the concatenated speech metric.

19 Claims, 10 Drawing Sheets

(56) References Cited

U.S. PATENT DOCUMENTS

| | | | |
|---|---|---|---|
| 8,226,416 B2* | 7/2012 | Abrash | G09B 5/04 434/156 |
| 2004/0064321 A1* | 4/2004 | Cosatto et al. | 704/276 |
| 2008/0140401 A1* | 6/2008 | Abrash | G09B 19/06 704/251 |

OTHER PUBLICATIONS

Cucchiarini, Catia, Strik, Helmer, Boves, Lou; Quantitative Assessment of Second Language Learners' Fluency: Comparisons Between Read and Spontaneous Speech; Journal of the Acoustical Society of America, 107(2); pp. 989-999; 2000.

Franco, Horacio, Neumeyer, Leonardo, Digalakis, Vassilios, Ronen, Orith; Combination of Machine Scores for Automatic Grading of Pronunciation Quality; Speech Communication, 30; pp. 121-130; 2000.

Graham, C., Lonsdale, Deryle; Kennington, Casey; Johnson, Aaron, McGhee, Jeremiah; Eliciting Imitation as an Oral Proficiency Measure with ASR Scoring; The 6th International Language Resources and Evaluation Conference; pp. 1604-1610; 2008.

Higgins, Derrick; Xi, Xiaoming, Zechner, Klaus, Williamson, David; A Three-Stage Approach to the Automated Scoring of Spontaneous Spoken Responses; Computer Speech and Language, 25; pp. 282-306; 2011.

Jang, T.Y.; Speech Rhythm Metrics or Automatic Scoring of English Speech by Korean EFL Learners; Malsori (Speech Sounds) The Korean Society of Phonetic Sciences and Speech Technology, 66; pp. 41-59; 2008.

Neumeyer, Leonardo, Franco, Horacio, Digalakis, Vassilios Weintraub, Mitchell; Automatic Scoring of Pronunciation Quality; Speech Communication, 6; 1999.

Vintner, Thora; Elicited Imitation: A Brief Overview; International Journal of Applied Linguistics, 12(1); pp. 54-73; 2002.

Witt, Silke; Use of the Speech Recognition in Computer-Assisted Language Learning; Unpublished Dissertation, Cambridge University, Engineering Department; Cambridge, U.K.; 1999.

Yoon, Su-Youn, Evanini, Keelan, Zechner, Klaus; Non-Scorable Response Detection for Automated Speaking Proficiency Assessment; Proceedings of the 6th Workshop on Innovative Use of NLP for Building Educational Applications; pp. 152-160; 2011.

Zechner, Klaus, Xi, Xiaoming, Chen, Lei; Evaluating Prosodic Features for Automated Scoring of Non-Native Read Speech; Educational Testing Service, Princeton, NJ; 2011.

Zechner, Klaus, Higgins, Derrick, Xi, Xiaoming, Williamson, David; Automatic Scoring of Non-Native Spontaneous Speech in Tests of Spoken English; Speech Communication, 51; pp. 883-895; 2009.

* cited by examiner

COMPUTER-IMPLEMENTED SYSTEMS AND METHODS FOR SCORING CONCATENATED SPEECH RESPONSES

CROSS-REFERENCE TO RELATED APPLICATIONS

This application claims the benefit of U.S. Provisional Patent Application Nos. 61/512,561 filed on Jul. 28, 2011, 61/566,159 filed on Dec. 2, 2011, and 61/620,005 filed on Apr. 4, 2012, the entire contents of each of which are incorporated herein by reference.

TECHNICAL FIELD

This document relates generally to speech scoring and more particularly to determining speech proficiency metrics using concatenated speech responses.

BACKGROUND

Automated speech assessment systems are used in conjunction with standardized or other tests designed to test a non-native speaker's proficiency in speaking a certain language (e.g., Pearson Test of English Academic, Test of English as a Foreign Language, International English Language Testing System). In these tests, a verbal response is elicited from a test-taker by providing a test prompt, which asks the test-taker to construct a particular type of verbal response. For example, the test prompt may ask the test-taker to read aloud a word or passage, describe an event, or state an opinion about a given topic. The test-taker's response may be received at a computer-based system and analyzed to generate a score.

SUMMARY

In accordance with the teachings herein, systems and methods are provided for scoring non-native speech. Two or more speech samples are received, where each of the samples are of speech spoken by a non-native speaker, and where each of the samples are spoken in response to distinct prompts. The two or more samples are concatenated to generate a concatenated response for the non-native speaker, where the concatenated response is based on the two or more speech samples that were elicited using the distinct prompts. A concatenated speech proficiency metric is computed based on the concatenated response, and the concatenated speech proficiency metric is provided to a scoring model, where the scoring model generates a speaking score based on the concatenated speech metric.

As another example, a system for scoring non-native speech includes one or more data processors and one or more computer-readable mediums. The one or more computer-readable mediums include instructions for commanding the one or more data processors to execute steps. In the steps, two or more speech samples are received, where each of the samples is of speech spoken by a non-native speaker, and where each of the samples are spoken in response to distinct prompts. The two or more samples are concatenated to generate a concatenated response for the non-native speaker, where the concatenated response is based on the two or more speech samples that were elicited using the distinct prompts. A concatenated speech proficiency metric is computed based on the concatenated response, and the concatenated speech proficiency metric is provided to a scoring model, where the scoring model generates a speaking score based on the concatenated speech metric.

As a further example, a non-transitory computer-readable medium is encoded with instructions to command one or more data processors to execute steps for scoring non-native speech. In the steps, two or more speech samples are received, where each of the samples is of speech spoken by a non-native speaker, and where each of the samples are spoken in response to distinct prompts. The two or more samples are concatenated to generate a concatenated response for the non-native speaker, where the concatenated response is based on the two or more speech samples that were elicited using the distinct prompts. A concatenated speech proficiency metric is computed based on the concatenated response, and the concatenated speech proficiency metric is provided to a scoring model, where the scoring model generates a speaking score based on the concatenated speech metric.

DETAILED DESCRIPTION

Speech assessments typically use multiple types of constructed response (CR) items to assess a range of spoken proficiency levels of examinees. For certain assessments, prompts that elicit short and/or highly predictable responses are the most effective means of generating the desired assessment analytics of a non-native speaker's speaking ability. For example, when an assessment seeks to examine a speaker's pronunciation and word repeating accuracy, prompts (e.g., sentence repeat (SR) or elicited imitation (EI) prompts) that request short responses, such as 5 to 15 words in length and less than 5 seconds in duration, facilitate a speaker hearing the prompt and successfully remembering and speaking the provided script. While these short responses may offer a best look into a speaker's pronunciation and word repeat accuracy abilities, these short responses do not provide a sample of sufficient length to generate quality scores for other speaking metrics, such as prosody and fluency.

Figure 1:
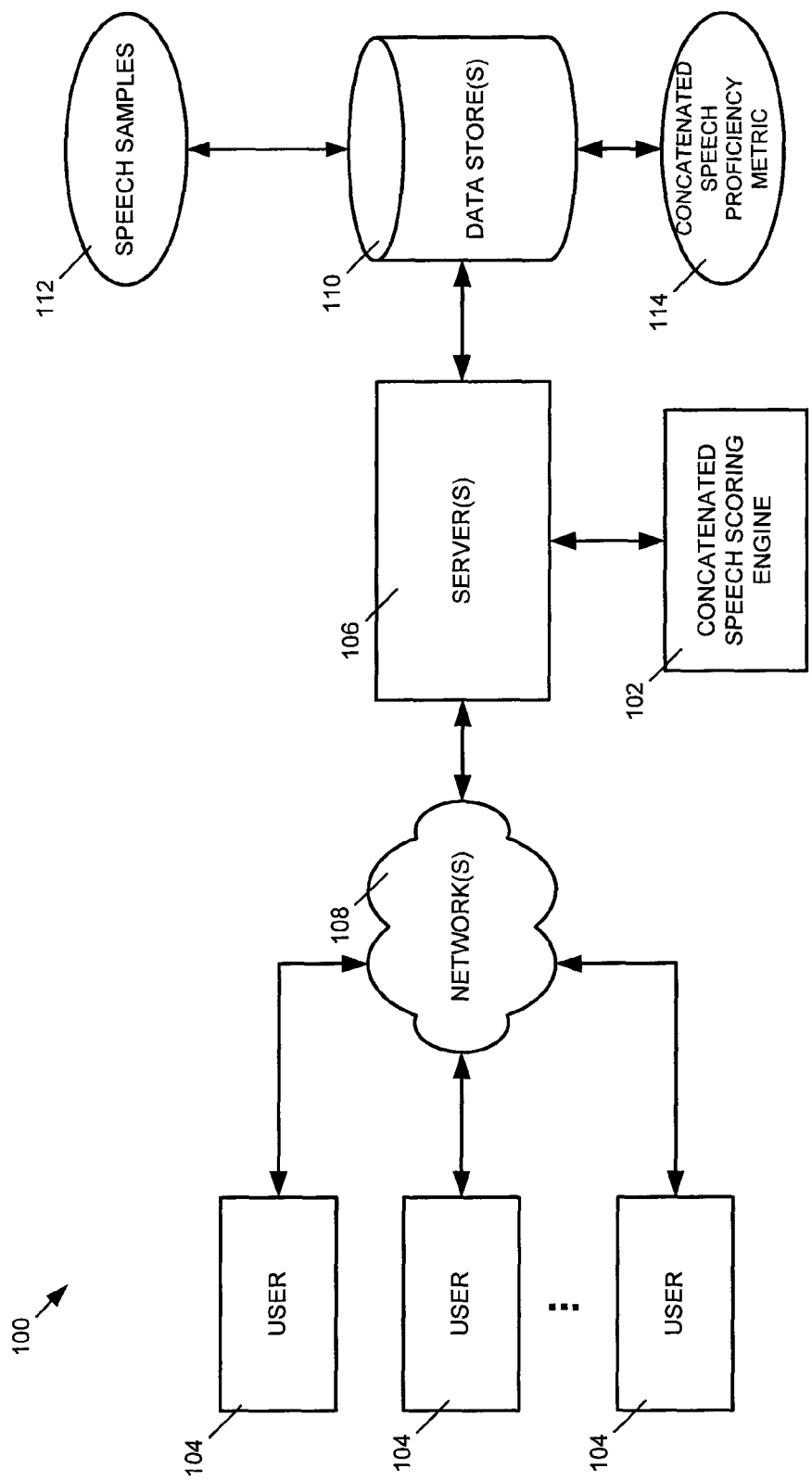
FIG. 1 is a block diagram depicting a computer-implemented concatenated speech scoring engine.

To address these and other issues, FIG. 1 is a block diagram depicting a computer-implemented concatenated speech scoring engine. A computer processing system implementing a concatenated speech scoring engine 102 (e.g., via any suitable combination of hardware, software, firmware, etc.) facilitates the scoring of constructed responses based on certain calculated speech proficiency metrics utilizing multiple speech samples that are spoken in response to multiple, distinct prompts. The concatenated speech scoring engine 102 provides a platform for users 104 to analyze the speaking proficiency displayed in received constructed speech responses. A user 104 accesses the concatenated speech scoring engine 102, which is hosted via one or more servers 106, via one or more networks 108. The one or more servers 106 communicate with one or more data stores 110. The one or more data stores 110 may contain a variety of data that includes speech samples 112 and concatenated speech proficiency metrics 114 computed based on the speech samples 112.

Figure 2:
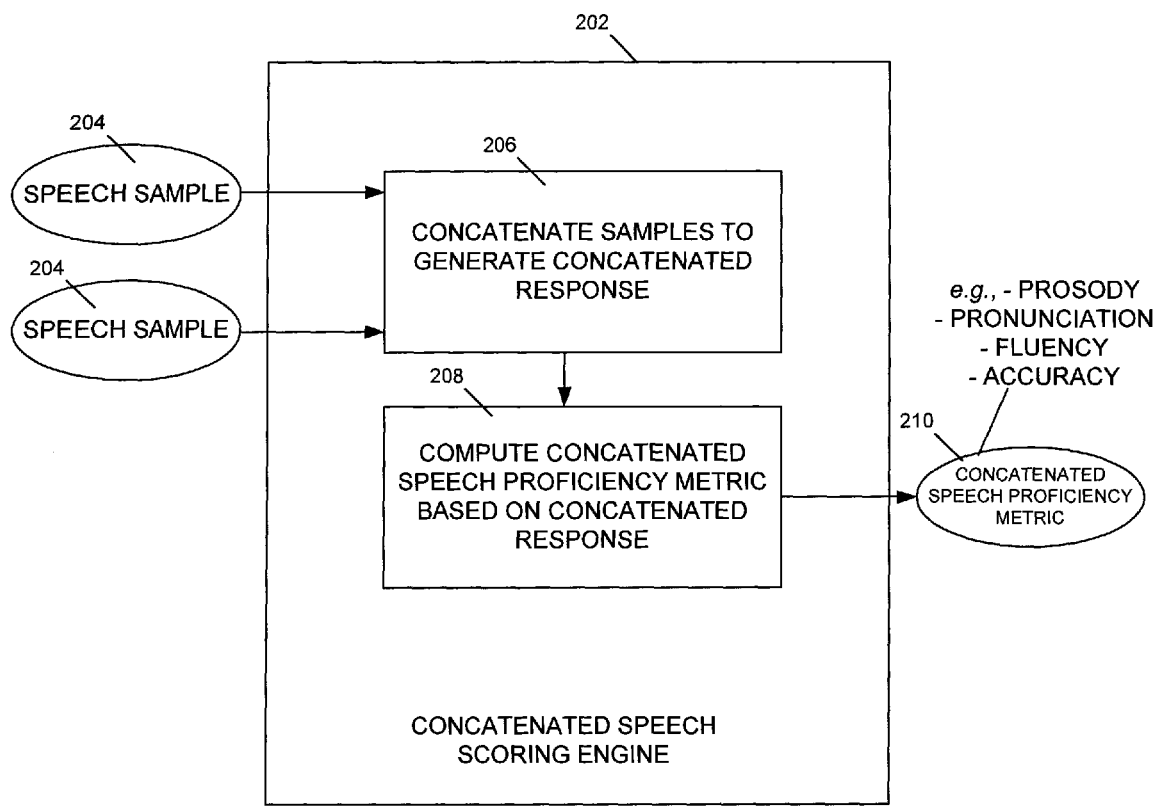
FIG. 2 is a block diagram depicting example details of a concatenated speech scoring engine.

FIG. 2 is a block diagram depicting example details of a concatenated speech scoring engine. The concatenated speech scoring engine 202 receives two or more speech samples 204, where each of the speech samples 204 are spoken by a non-native speaker, and where each of the speech samples 204 are spoken in response to distinct prompts. For example, a first prompt may ask the non-native speaker to repeat a first phrase, and a second prompt asks the non-native speaker to repeat a second phrase. As another example, a first prompt may ask the non-native speaker to recite his address, and second prompt asks the non-native speaker to speak about the weather. At 206, the multiple speech samples 204 are concatenated to generate a concatenated response for the non-native speaker, where the concatenated response is based on the speech samples 204 that were elicited using the distinct prompts. At 208, a concatenated speech proficiency metric 210 is computed based on the concatenated response. The concatenated speech proficiency metric 210 may measure a variety of characteristics of the speech responses 204 such as prosody, pronunciation, fluency, or accuracy characteristics. The concatenated speech proficiency metric 210 may be saved or outputted as a measurement of speaking proficiency on its own, or the metric 210 may be provided as an input to subsequent processing as a component in generating a speaking score.

Figure 3:
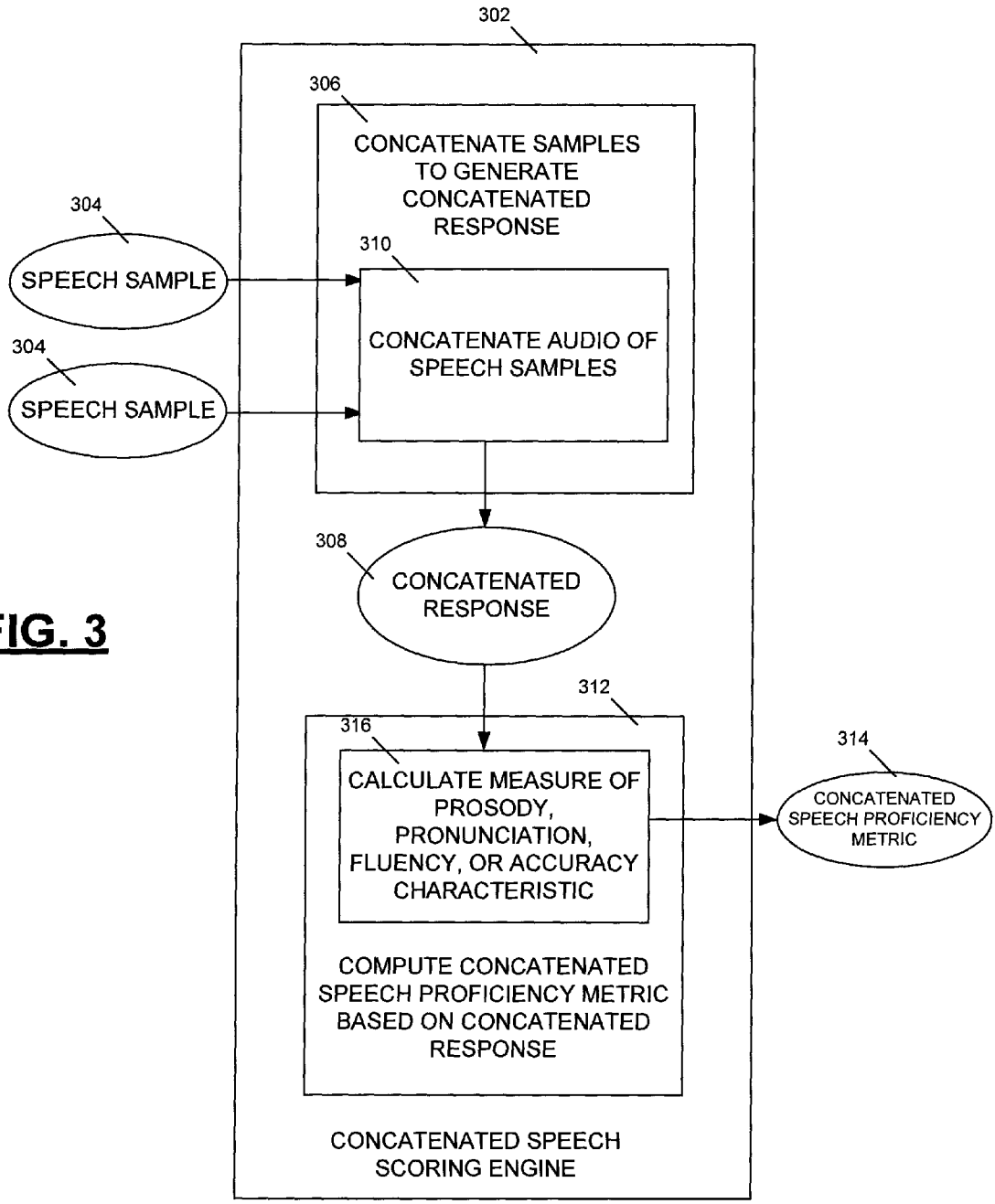
FIG. 3 is a block diagram depicting concatenating speech samples by concatenating audio of those speech samples.

FIG. 3 is a block diagram depicting concatenating speech samples by concatenating audio of those speech samples. A concatenated speech scoring engine 302 receives two or more speech samples 304, where each of the samples 304 is spoken in response to distinct prompts. At 306, the samples are concatenated to generate a concatenated response 308 by concatenating the audio of the speech samples, as indicated at 310. For example, an audio recording (e.g., .wav, .mp3) of a first speech sample is appended at the end of a recording of a second speech sample to generate the concatenated response 308. At 312, a concatenated speech proficiency metric 314 is calculated based on the concatenated response 308. For example, the concatenated speech proficiency metric 314 may be generated by calculating a measure of a prosody, pronunciation, or fluency characteristic(s) of the concatenated response, as indicated at 316. Such measures may be calculated by analyzing acoustic features of the concatenated response 308 such as pitch, power, syllable durations, pauses, stress, and intonation.

The utilization of a concatenated response 308 that is based on multiple speech samples 304 can offer improved calculation of certain concatenated speech proficiency metrics 314 when compared to calculation of those metrics using individual speech samples. For example, an individual speech sample that contains a recitation of only 5 words may not contain sufficient information to provide a reliable assessment of certain characteristics, such as a fluency characteristic. However, when multiple speech samples 304 are concatenated to form a longer concatenated response 308, measurements of fluency and other characteristics often are better correlated with human scores, an important goal of automated speech scoring, despite the individual speech samples 304 being taken at different times in response to distinct prompts.

Figure 4:
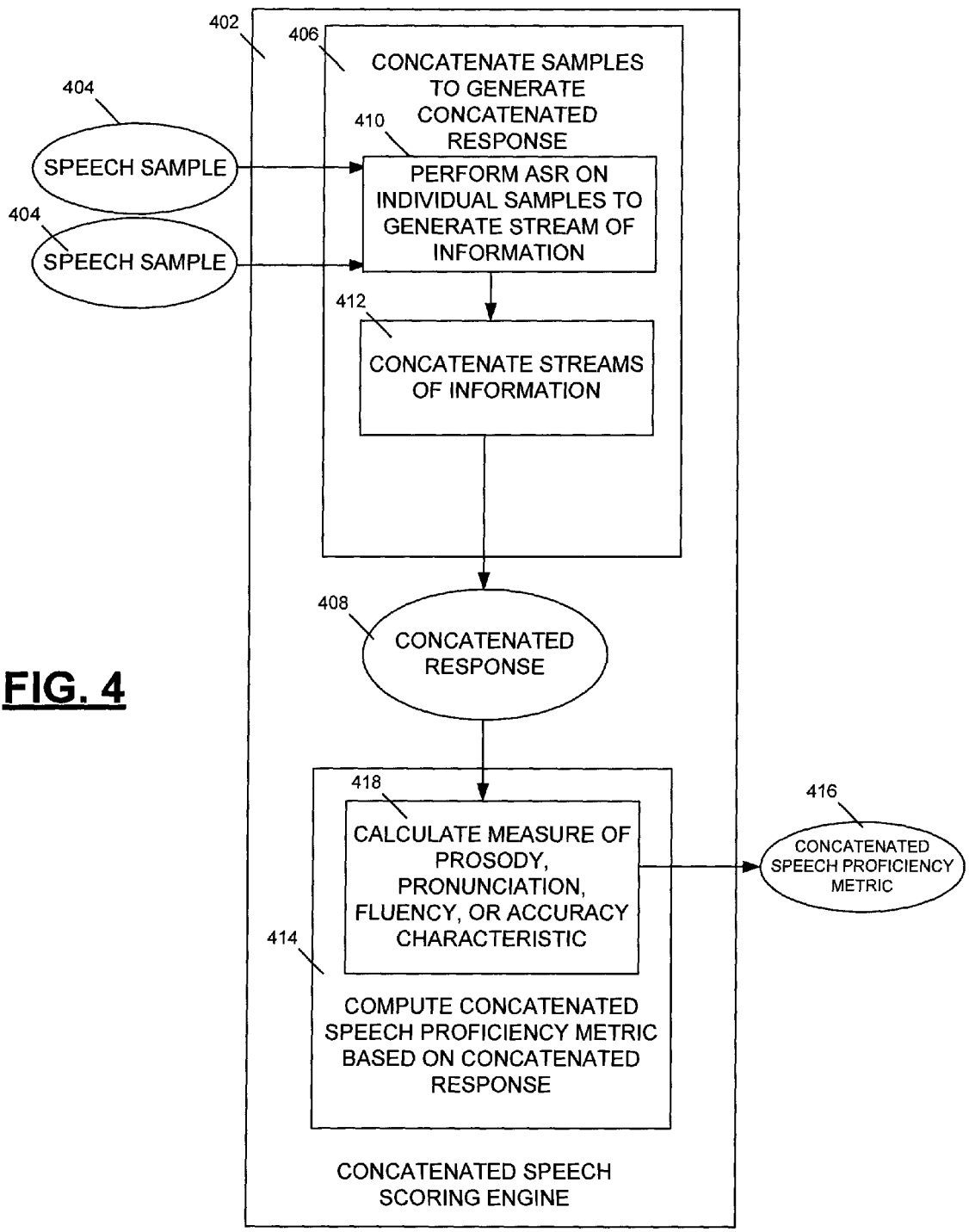
FIG. 4 is a block diagram depicting a second process for generating a concatenated response for scoring using streams of information.

FIG. 4 is a block diagram depicting a second process for generating a concatenated response for scoring. A concatenated speech scoring engine 402 receives two or more speech samples 404 for scoring. The scoring engine 402 concatenates the speech samples 404 at 406 to generate a concatenated response 408. Specifically, automatic speech recognition (ASR) is performed at 410 (e.g., using a forced alignment process) on the individual samples 404 to generate a stream of information for each speech sample 404. The streams of information are concatenated at 412 to generate the concatenated response 408, which comprises a stream of information. For example, the processing at 410 may extract a first stream of information from a first of the two or more speech samples 404. The processing at 410 may further extract a second stream of information from a second of the two or more speech samples. The processing at 412 then combines the first stream of information and the second stream of information to form the concatenated response 408.

The outputs of the automatic speech recognition at 410 (e.g., from a triphone acoustic model and/or bi-gram to four-gram language models) may take a variety of forms. For example, the automatic speech recognition may generate a transcript for each speech sample as well as one or more speech recognizer metrics or streams of speech recognizer metrics. The speech recognizer metrics may be utilized by downstream processing to compute a variety of speech proficiency metrics, such as prosody, pronunciation, and fluency. The speech recognizer metrics and the transcript may be used to compute pronunciation and accuracy metrics. Further, the speech recognizer metrics, the speech recognizer transcript, and/or a speaking script provided to a speaker (e.g., via writing or orally) may be used to compute accuracy metrics (e.g., prompt repeat accuracy). Example automatic speech recognition metrics may include word hypotheses, event time stamps, pitch metrics, power metrics, syllable metrics, stress metrics, and intonation metrics. In one example Educational Testing Service's SpeechRater$^{SM}$ is used to perform speech recognition, yielding a word hypothesis and accompanying time stamps as well as prosodic features, such as pitch and power, and other measurements that can be used for computing speech fluency, pronunciation, prosody, and repeat-accuracy.

The concatenated response 408 generated by concatenating the streams of information is provided for computation of a concatenated speech proficiency metric at 414. A concatenated speech proficiency metric 416 is computed at 418 by calculating one or more of a measure of prosody, pronunciation, fluency, or speaking accuracy characteristic.

Figure 5A:
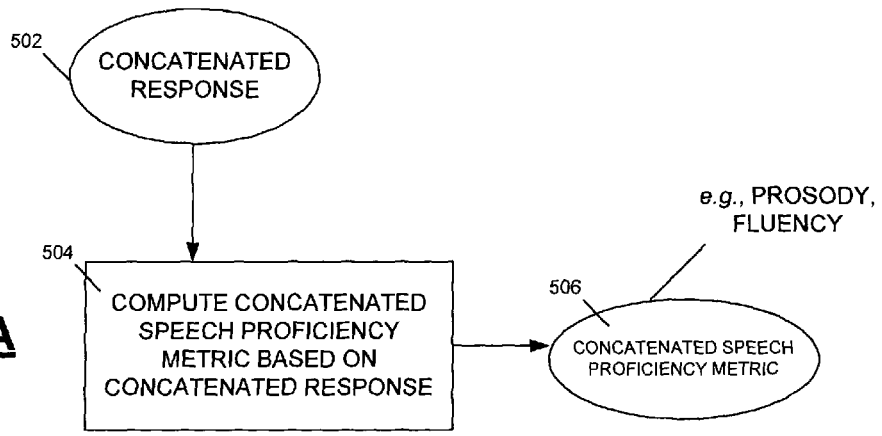
FIGS. 5A-5C depict computation of different concatenated speech proficiency metrics based on different inputs.
Figure 5B:
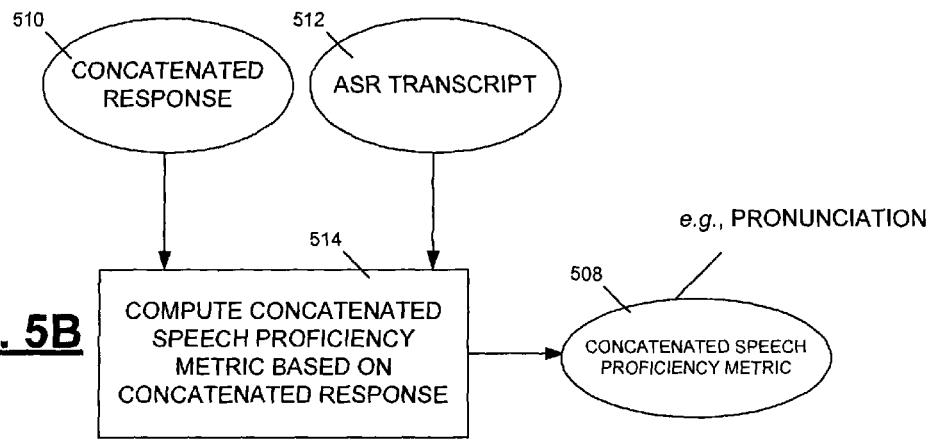
Figure 5C:
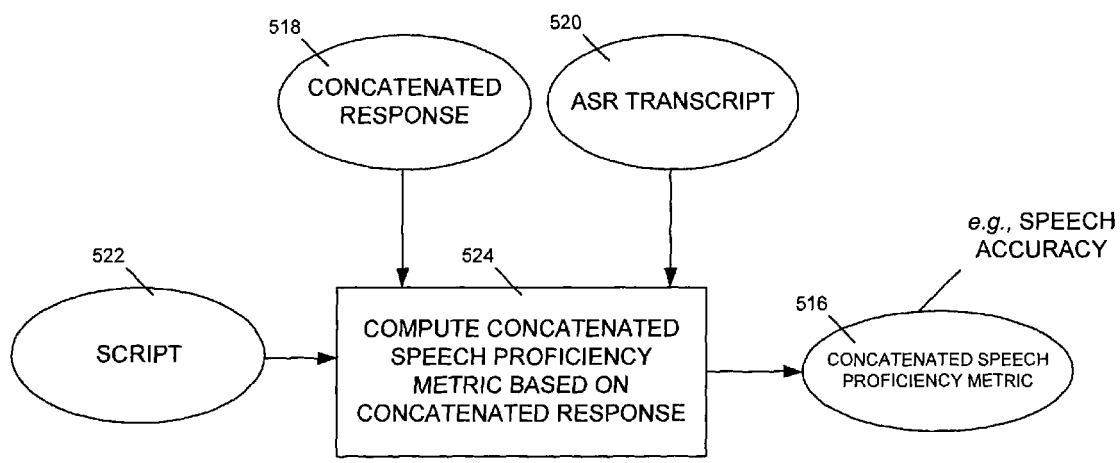

FIGS. 5A-5C depict computation of different concatenated speech proficiency metrics based on different inputs. In FIG. 5A, a concatenated response 502 is analyzed at 504 to compute concatenated speech proficiency metrics 506 such as prosody metrics and fluency metrics. The metrics 506 can be calculated in different ways. For example, the concatenated response 502 may comprise concatenated audio from multiple speech samples elicited using different prompts. The computing at 504 may analyze certain audio features of the concatenated audio to compute the concatenated speech proficiency metric 506. In another example, the concatenated response 502 is a stream of information, such as automatic speech recognition metrics, that are used to compute the concatenated speech proficiency metric 506.

FIG. 5B depicts the computing of a pronunciation concatenated speech proficiency metric 508 based on a concatenated response 510 and an automatic speech recognizer transcript 512. Computation of a pronunciation metric at 514 may utilize a transcript 512 generated by an automatic speech recognizer, where the transcript of what words detected to have been said in the speech samples is used to determine how well those words were pronounced. The concatenated response may be in the form of a concatenation of audio or may comprise a stream of information, such as phonemes detected by an automatic speech recognizer.

FIG. 5C depicts the computing of a speech accuracy concatenated speech proficiency metric 516 based on a concatenated response 518, an automatic speech recognizer transcript 520, and a prompt script 522. The speech accuracy concatenated speech proficiency metric 516 may be computed at 524 via a comparison of an automatic speech recognizer transcript 520 containing words detected to have been said in the speech samples and a prompt script 522 containing words that are expected to have been said (e.g., a string of words provided to a non-native speaker in writing or audibly seeking spoken repetition in response). A comparison of the detected words in the transcript 520 to the expected words in the script 522 is made at 524 to generate the speech accuracy concatenated speech proficiency metric 516.

Figure 6:
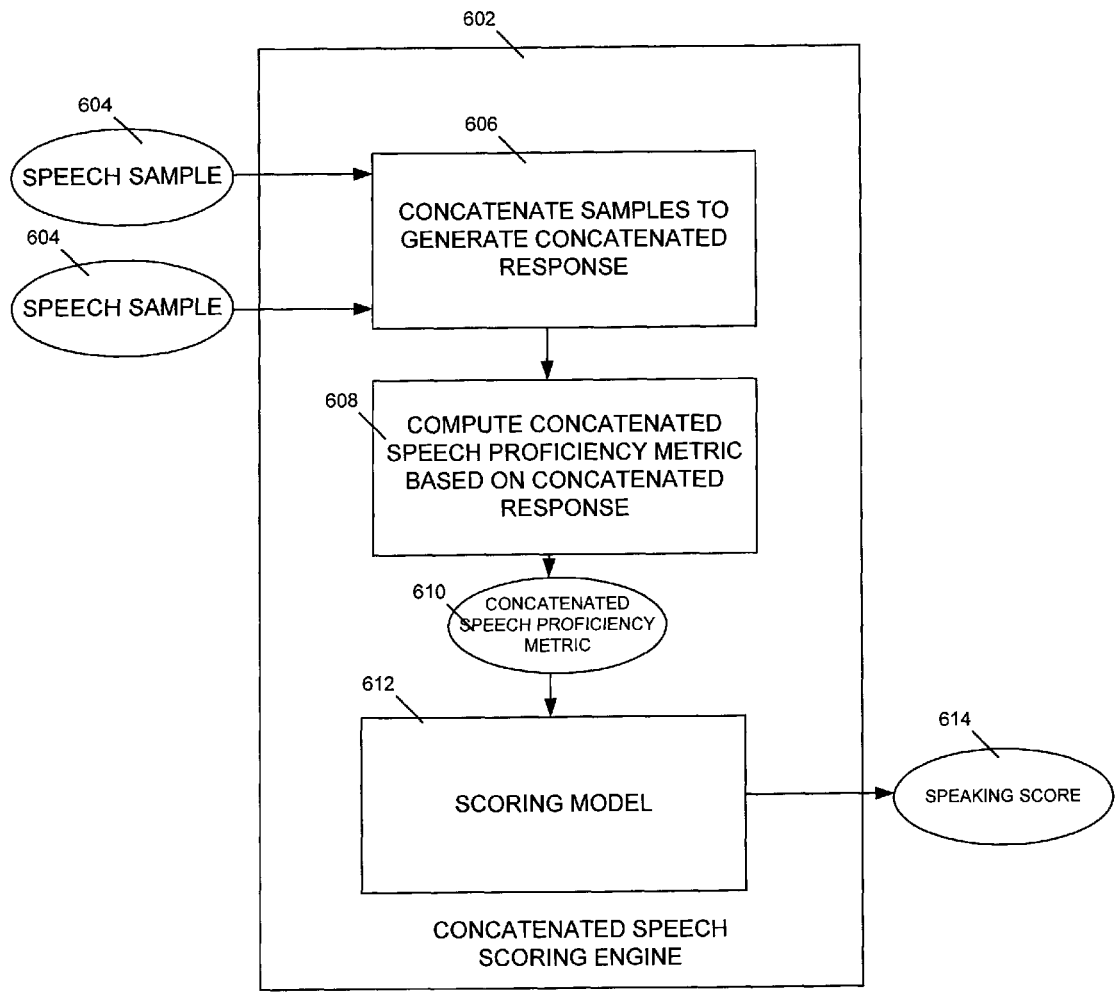
FIG. 6 is a block diagram depicting a concatenated speech scoring engine that includes a scoring model.

As noted above, a concatenated speech proficiency metric may be output as an indicator of the quality of a plurality of speech samples alone. In some implementations, the concatenated speech proficiency metric is considered in combination with one or more additional features in providing a speaking score for a speaker. FIG. 6 is a block diagram depicting a concatenated speech scoring engine that includes a scoring model. The concatenated speech scoring engine 602 receives two or more speech samples 604, where each of the speech samples 604 are spoken by a non-native speaker, and where each of the speech samples 604 are spoken in response to distinct prompts. At 606, the multiple speech samples 604 are concatenated to generate a concatenated response for the non-native speaker, where the concatenated response is based on the speech samples 604 that were elicited using the distinct prompts. At 608, a concatenated speech proficiency metric 610 is computed based on the concatenated response. The concatenated speech proficiency metric 610 may measure a variety of characteristics of the speech responses 604 such as prosody, pronunciation, fluency, or accuracy characteristics. The concatenated speech proficiency metric 610 is provided to a scoring model 612 that considers the concatenated speech proficiency 610 as well as one or more other metrics to generate a speaking score 614 for the speaker.

Figure 7:
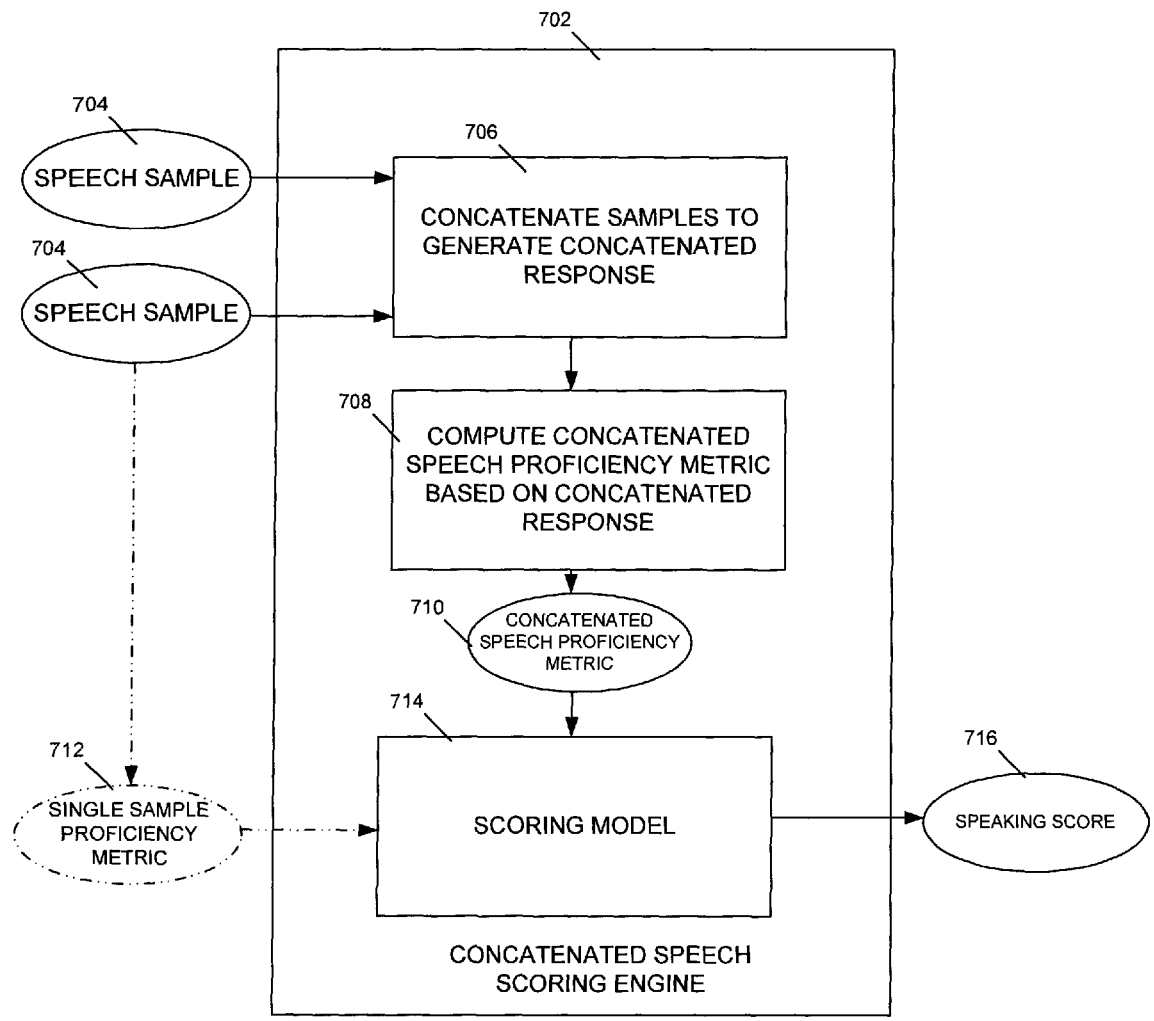
FIG. 7 is a block diagram depicting the generation of a speaking score using a concatenated speech proficiency metric and a single sample proficiency metric.

FIG. 7 is a block diagram depicting the generation of a speaking score using a concatenated speech proficiency metric and a single sample (i.e., exactly one sample) proficiency metric. The concatenated speech scoring engine 702 receives two or more speech samples 704, where each of the speech samples 704 are spoken by a non-native speaker, and where each of the speech samples 704 are spoken in response to distinct prompts. At 706, the multiple speech samples 704 are concatenated to generate a concatenated response for the non-native speaker, where the concatenated response is based on the speech samples 704 that were elicited using the distinct prompts. At 708, a concatenated speech proficiency metric 710 is computed based on the concatenated response.

In addition to the concatenated speech proficiency metric 710, one or more single sample proficiency metrics 712 are computed based on one or more of the speech samples 704. For example, the single sample proficiency metric 712 may be a content metric based on the content of one speech sample. The content metric may analyze the responsiveness or appropriateness of a single speech sample 704 to a given prompt that elicited that sample. For example, a response that says "I am well, thank you," would receive a high content single sample proficiency metric 712 for prompt that asks, "How are you today?" while a response that says "It is sunny out," would receive a lower content single sample proficiency metric 712.

A scoring model 714 receives the single sample proficiency metric 712 (e.g., measuring the content of a particular speech sample) and the concatenated speech proficiency metric 710 (e.g., measuring the fluency and prosody of the multiple speech samples 704) and uses those metrics 710, 712 to generate a speaking score 716 for the sample 704.

Figure 8:
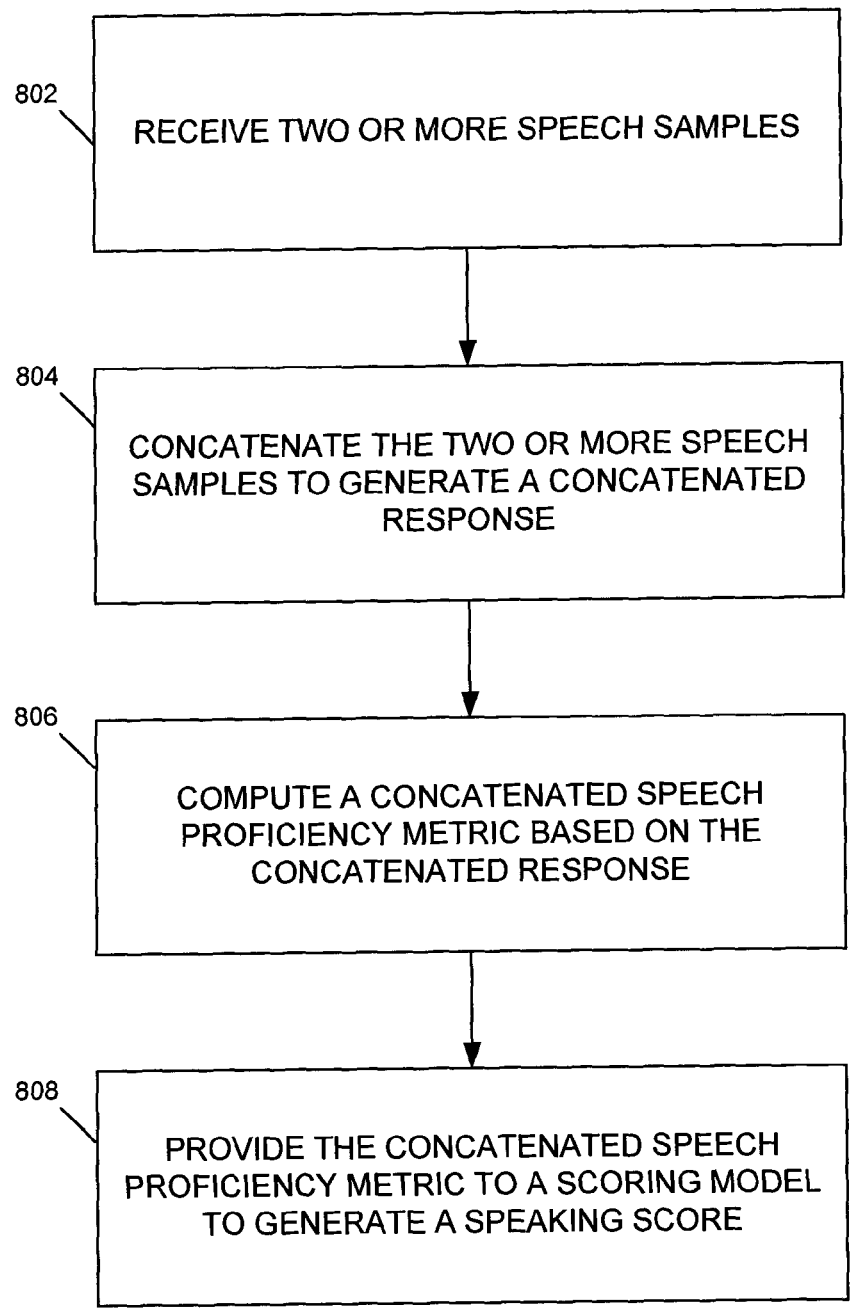
FIG. 8 is a flow diagram depicting a method of scoring non-native speech.

FIG. 8 is a flow diagram depicting a method of scoring non-native speech. Two or more speech samples are received at 802, where each of the samples are of speech spoken by a non-native speaker, and where each of the samples are spoken in response to distinct prompts. The two or more samples are concatenated at 804 to generate a concatenated response for the non-native speaker, where the concatenated response is based on the two or more speech samples that were elicited using the distinct prompts. A concatenated speech proficiency metric is computed at 806 based on the concatenated response, and the concatenated speech proficiency metric is provided to a scoring model at 808, where the scoring model generates a speaking score based on the concatenated speech metric.

Figure 9A:
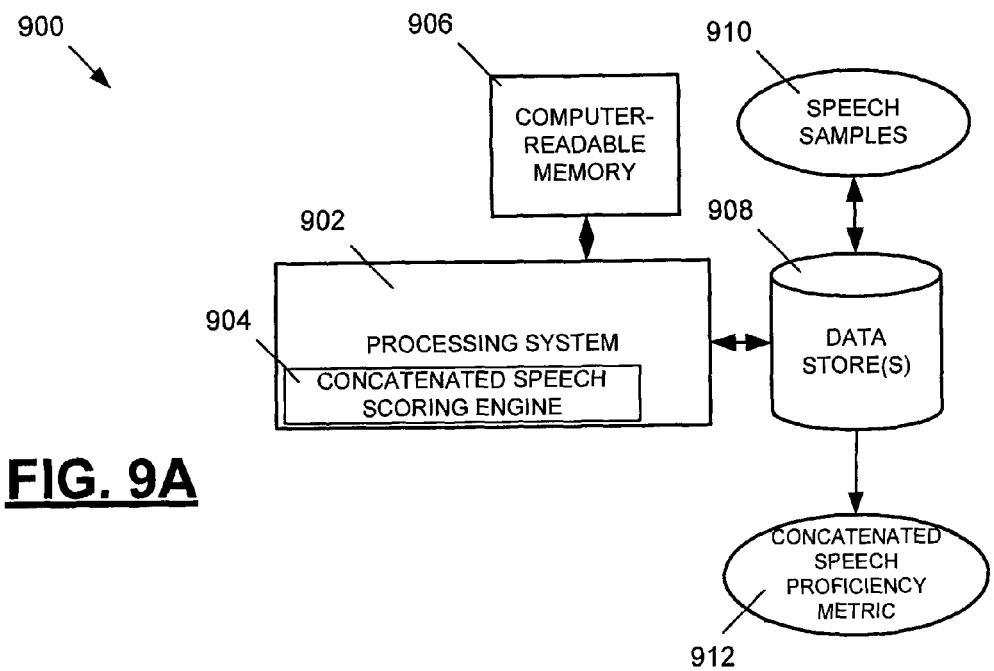
FIGS. 9A, 9B, and 9C depict example systems for use in implementing a concatenated speech scoring engine.
Figure 9B:
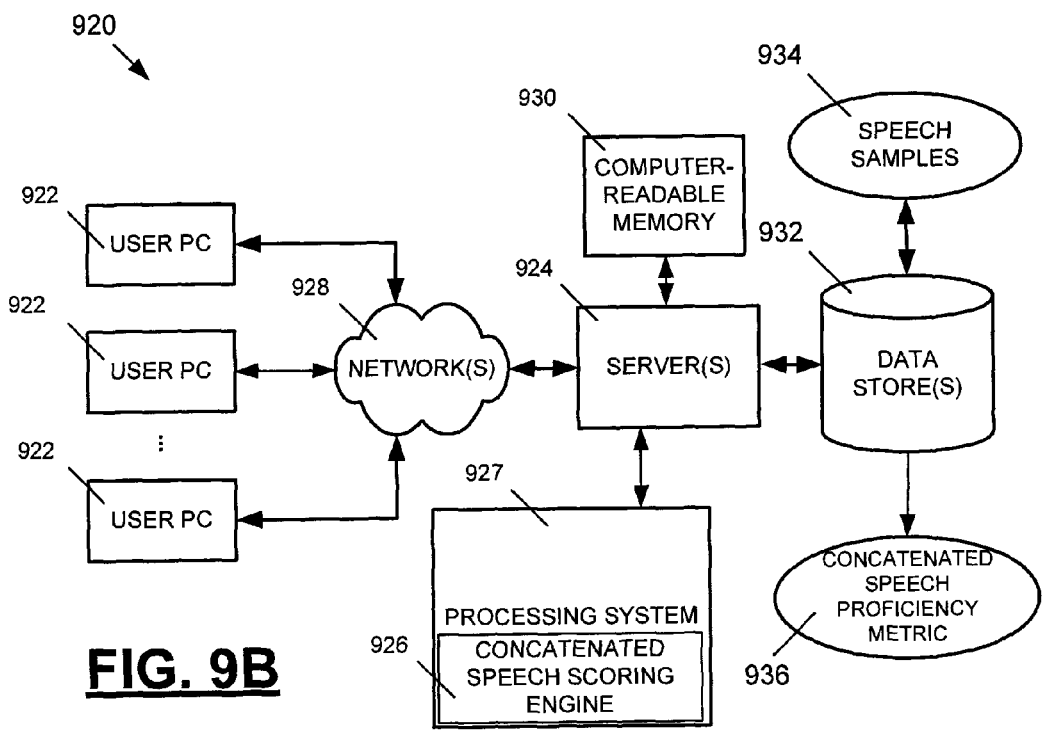
Figure 9C:
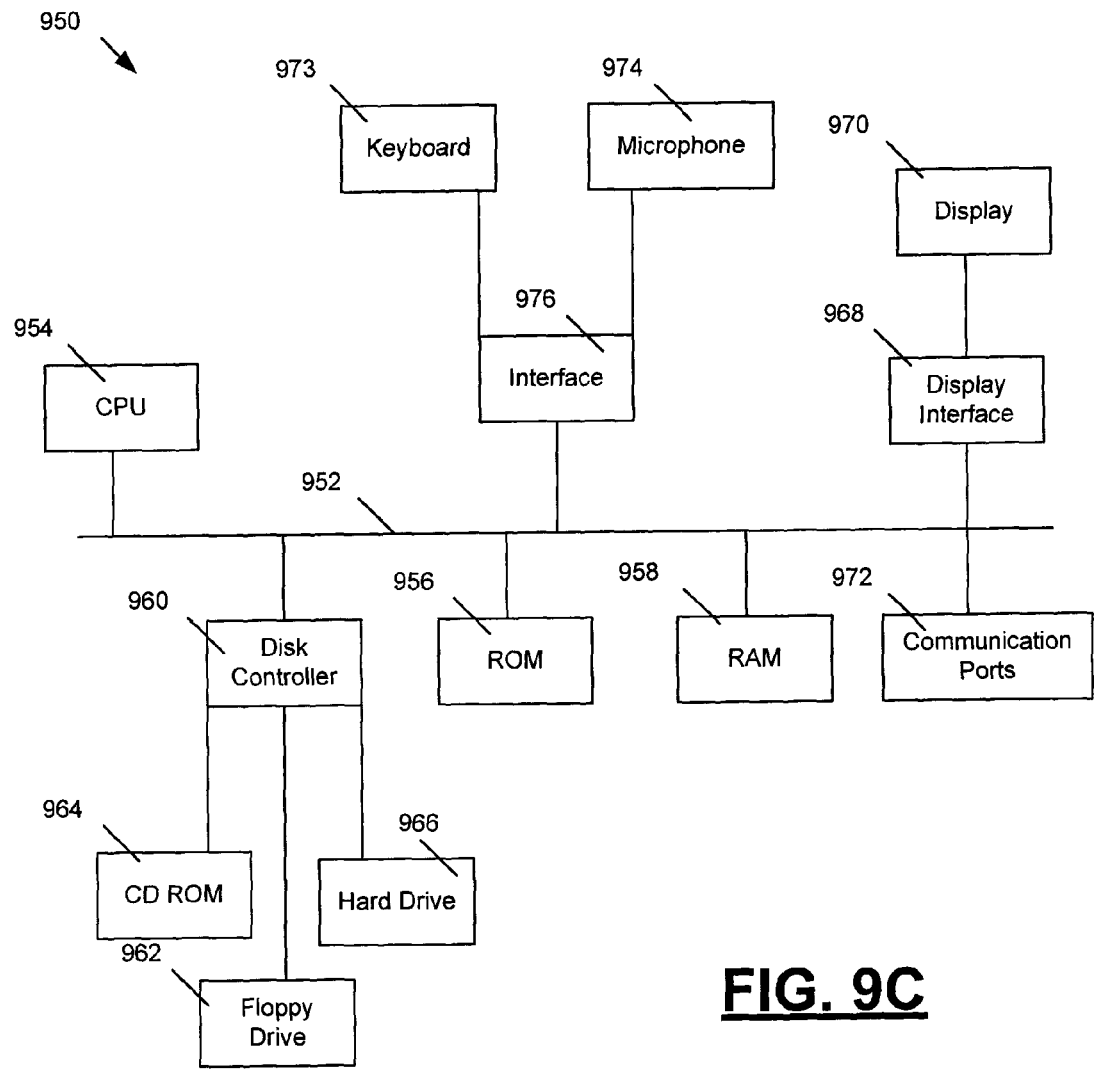

Examples have been used to describe the invention herein, and the scope of the invention may include other examples. FIGS. 9A, 9B, and 9C depict example systems for use in implementing a concatenated speech scoring engine. For example, FIG. 9A depicts an exemplary system 900 that includes a standalone computer architecture where a processing system 902 (e.g., one or more computer processors located in a given computer or in multiple computers that may be separate and distinct from one another) includes a concatenated speech scoring engine 904 being executed on it. The processing system 902 has access to a computer-readable memory 906 in addition to one or more data stores 908. The one or more data stores 908 may include speech samples 910 as well as concatenated speech proficiency metrics 912.

FIG. 9B depicts a system 920 that includes a client server architecture. One or more user PCs 922 access one or more servers 924 running a concatenated speech scoring engine 926 on a processing system 927 via one or more networks 928. The one or more servers 924 may access a computer readable memory 930 as well as one or more data stores 932. The one or more data stores 932 may contain speech samples 934 as well as concatenated speech proficiency metrics 936.

FIG. 9C shows a block diagram of exemplary hardware for a standalone computer architecture 950, such as the architecture depicted in FIG. 9A that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 956 and random access memory (RAM) 958, may be in communication with the processing system 954 and may contain one or more programming instructions for performing the method of implementing a concatenated speech scoring engine. Optionally, program instructions may be stored on a non-transitory computer readable storage medium such as a magnetic disk, optical disk, recordable memory device, flash memory, or other physical storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 972.

In addition to the standard computer-type components, the hardware may also include data input devices, such as a keyboard 973, or other input device 974, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of scoring non-native speech, comprising:

receiving, using a processing system, two or more speech samples, wherein each of the samples is of speech spoken by a non-native speaker, the two or more speech samples including (i) a first audio recording of a first spoken response that responds to a first prompt, and (ii) a second audio recording of a second spoken response that responds to a second prompt, the second prompt being different from the first prompt, wherein the first audio recording is distinct from the second audio recording and is captured at a different time than the second audio recording, and wherein each of the samples is spoken in response to distinct prompts;

concatenating, using the processing system, the two or more samples to generate a concatenated response for the non-native speaker, wherein the concatenating includes appending the second audio recording at an end of the first audio recording, and wherein the concatenated response is based on the two or more speech samples that were elicited using the distinct prompts;

computing, using the processing system, a concatenated speech proficiency metric based on the concatenated response;

providing, using the processing system, the concatenated speech proficiency metric to a scoring model, wherein the scoring model generates a speaking score based on the concatenated speech metric.

2. The method of claim 1, wherein the concatenated response comprises an audio concatenation of the two or more speech samples.

3. The method of claim 1, wherein the concatenating the two or more speech samples includes:

extracting a first stream of information from a first of the two or more speech samples;

extracting a second stream of information from a second of the two or more speech samples; and combining the first stream of information and the second stream of information to form the concatenated response.

4. The method of claim 1, wherein the concatenated speech proficiency metric measures a prosody characteristic, a pronunciation characteristic, or a fluency characteristic of the concatenated response.

5. The method of claim 1, further comprising:

performing automatic speech recognition on a concatenation of the two or more speech samples using an automatic speech recognition system to generate speech recognizer outputs including a transcript, forced alignment information, and one or more speech recognizer metrics.

6. The method of claim 5, wherein the concatenated speech proficiency metric is a pronunciation metric that is computed based on the concatenated response, the transcript, the forced alignment information, and the one or more speech recognizer metrics.

7. The method of claim 5, wherein the speech samples are scripted speech samples, and wherein the prompts include a script.

8. The method of claim 7, wherein the concatenated speech proficiency metric is an accuracy metric that is computed based on the concatenated response, the script, the transcript, and the one or more speech recognizer metrics.

9. The method of claim 5, wherein the one or more speech recognizer metrics include one or more of time stamps, a pitch metric, a power metric, a syllable metric, a stress metric, and an intonation metric.

10. The method of claim 1, further comprising computing a single sample proficiency metric, wherein the single sample proficiency metric is computed based on exactly one of the two or more speech samples, and wherein the speaking score is generated based on the single sample proficiency metric.

11. The method of claim 1, wherein the distinct prompts are sentence repeat prompts or elicited imitation prompts.

12. A computer implemented system for scoring non-native speech, comprising:
    a processing system;
    one or more non-transitory computer readable mediums encoded with instructions for commanding the processing system to execute steps including:
        receiving two or more speech samples, wherein each of the samples is of speech spoken by a non-native speaker, the two or more speech samples including (i) a first audio recording of a first spoken response that responds to a first prompt, and (ii) a second audio recording of a second spoken response that responds to a second prompt, the second prompt being different from the first prompt, wherein the first audio recording is distinct from the second audio recording and is captured at a different time than the second audio recording, wherein each of the samples is spoken in response to distinct prompts;
        concatenating the two or more speech samples to generate a concatenated response for the non-native speaker, wherein the concatenating includes appending the second audio recording at an end of the first audio recording, and wherein the concatenated response is based on the two or more speech samples that were elicited using the distinct prompts;
        computing a concatenated speech proficiency metric based on the concatenated response;
        providing the concatenated speech proficiency metric to a scoring model, wherein the scoring model generates a speaking score based on the concatenated speech metric.

13. The system of claim 12, wherein the one or more non-transitory computer readable mediums include a random access memory.

14. The system of claim 12, wherein the concatenated response comprises an audio concatenation of the two or more speech samples.

15. The system of claim 12, wherein the concatenating the two or more speech samples includes:
    extracting a first stream of information from a first of the two or more speech samples;
    extracting a second stream of information from a second of the two or more speech samples; and
    combining the first stream of information and the second stream of information to form the concatenated response.

16. The system of claim 12, wherein the steps further comprise:
    performing automatic speech recognition on the two or more speech samples using an automatic speech recognition system to generate speech recognizer outputs including a transcript, forced alignment information, and one or more speech recognizer metrics.

17. The system of claim 16, wherein the concatenated speech proficiency metric is a pronunciation metric that is computed based on the concatenated response, the transcript, and the one or more speech recognizer metrics.

18. The system of claim 16, wherein the speech samples are scripted speech samples, wherein the prompts include a script, and wherein the concatenated speech proficiency metric is an accuracy metric that is computed based on the concatenated response, the script, the transcript, and the one or more speech recognizer metrics.

19. One or more non-transitory computer readable mediums encoded with instructions for commanding a processing system to execute steps for scoring non-native speech, the steps comprising:
    receiving two or more speech samples, wherein each of the samples is of speech spoken by a non-native speaker, the two or more speech samples including (i) a first audio recording of a first spoken response that responds to a first prompt, and (ii) a second audio recording of a second spoken response that responds to a second prompt, the second prompt being different from the first prompt, wherein the first audio recording is distinct from the second audio recording and is captured at a different time than the second audio recording, wherein each of the samples is spoken in response to distinct prompts;
    concatenating the two or more samples to generate a concatenated response for the non-native speaker, wherein the concatenating includes appending the second audio recording at an end of the first audio recording, and wherein the concatenated response is based on the two or more speech samples that were elicited using the distinct prompts;
    computing a concatenated speech proficiency metric based on the concatenated response;
    providing the concatenated speech proficiency metric to a scoring model, wherein the scoring model generates a speaking score based on the concatenated speech metric.

* * * * *